United States Patent
Baugh

(10) Patent No.: US 6,435,771 B1
(45) Date of Patent: Aug. 20, 2002

(54) METHOD FOR ATTACHING SUBSEA MANIFOLD TO PIPELINE TEE

(76) Inventor: Benton F. Baugh, 14626 Oak Bend, Hou, TX (US) 77079

( * ) Notice: Subject to any disclaimer, the term of this patent is extended or adjusted under 35 U.S.C. 154(b) by 0 days.

(21) Appl. No.: 09/722,214

(22) Filed: Nov. 27, 2000

(51) Int. Cl.[7] .............................. F16L 1/00; B63B 35/04
(52) U.S. Cl. ................ 405/158; 405/154.1; 405/184.4; 405/188; 166/338; 166/348
(58) Field of Search .............................. 405/154.1, 155, 405/158, 166, 167, 168.3, 184.4, 188, 190, 191; 166/338, 339, 340, 341, 348, 365

(56) References Cited

U.S. PATENT DOCUMENTS

| | | | |
|---|---|---|---|
| 3,472,034 A | | 10/1969 | Lawrence |
| 3,524,326 A | | 8/1970 | Craste |
| 3,581,506 A | | 6/1971 | Howard |
| 3,603,617 A | * | 9/1971 | Lochridge ............... 166/338 X |
| 3,680,322 A | | 8/1972 | Nolan, Jr. et al. |
| 3,747,356 A | | 7/1973 | Lochridge et al. |
| 3,781,041 A | * | 12/1973 | Petzetakis ................... 285/111 |
| 3,851,492 A | * | 12/1974 | Cannon et al. ............. 405/191 |
| 3,860,122 A | | 1/1975 | Cernosek |
| 3,937,334 A | | 2/1976 | Bleyl et al. |
| RE29,591 E | * | 3/1978 | Lloyd ......................... 405/168 |
| 4,340,322 A | | 7/1982 | Springett et al. |
| 4,465,400 A | * | 8/1984 | Adams ....................... 405/170 |
| 4,486,123 A | | 12/1984 | Koch et al. |
| 4,569,168 A | | 2/1986 | McGovney et al. |
| 4,704,050 A | | 11/1987 | Wallace |
| 4,784,525 A | * | 11/1988 | Francois ..................... 405/191 |
| 5,002,318 A | * | 3/1991 | Witter ........................ 285/302 |
| 5,035,266 A | * | 7/1991 | Benson et al. ................ 138/92 |
| 5,145,289 A | | 9/1992 | Titus |
| 5,421,675 A | | 6/1995 | Brown et al. |
| 5,458,441 A | | 10/1995 | Barry |
| 5,464,307 A | | 11/1995 | Wilkins |
| 5,527,134 A | | 6/1996 | Recalde |
| 5,575,590 A | * | 11/1996 | Drost et al. .................. 405/166 |
| 5,857,715 A | * | 1/1999 | Gray et al. .............. 285/131.1 |
| 5,971,666 A | | 10/1999 | Martin et al. |
| 6,004,072 A | * | 12/1999 | Cunningham ............... 405/170 |
| 6,022,421 A | * | 2/2000 | Bath et al. ...................... 134/8 |
| 6,200,068 B1 | * | 3/2001 | Bath et al. ............... 405/154.1 |
| 6,213,686 B1 | | 4/2001 | Baugh |
| 6,290,432 B1 | * | 9/2001 | Exely et al. ................. 405/173 |

FOREIGN PATENT DOCUMENTS

| | | | | |
|---|---|---|---|---|
| FR | 2556813 | * | 6/1985 | ................. 405/158 |
| GB | 1178219 | | 1/1970 | |
| GB | 2036917 | * | 7/1980 | ................. 405/158 |

* cited by examiner

*Primary Examiner*—Heather Shackelford
*Assistant Examiner*—Jong-Suk Lee

(57) ABSTRACT

A method for attaching subsea manifolds to subsea pipelines which includes attaching a tee member into the pipeline on a vessel, running the portion of the pipeline through support structures which would not pass the manifold, and to an underwater location between the vessel and the ocean floor, then attaching the manifold to the tee section, and then lowering the tee and manifold to the ocean floor.

20 Claims, 10 Drawing Sheets

METHOD FOR ATTACHING SUBSEA MANIFOLD TO PIPELINE TEE

BACKGROUND OF THE INVENTION

1. Field of the Invention

This invention relates generally to the inclusion of subsea manifolds while laying underwater pipelines when the inclusion of the manifolds at the conventional work area is made impractical due to space or operational considerations.

2. Description of the Related Art

Subsea manifolds are generally rectangular structures with a representative size for discussion being 12 feet wide by 10 feet tall by 25 feet long. In the long direction and approximately 3 feet above the bottom of the skid a main pipeline will pass through the skid. The main pipeline is not usually at the bottom of the skid because the main skid structural beams are at the bottom and any valves in the pipeline would have downward protrusions.

Subsea manifolds are typically for the purpose of making connections between short run and long run pipelines on the sea floor. The arrangement of pipelines on the ocean floor looks much like the arrangement of roads on a map. Individual subsea oil or gas completion pipelines (called flowlines) must tie into larger and longer pipelines to ultimately get the produced fluids to the shore. Although most subsea manifolds will be of the pipeline connection type, others include pig launchers, control skids, and pumping skids.

Subsea pipelines have most often been laid on the ocean floor by connection of welding on the deck of a barge, lowering off the back of the barge down a stinger, and then laying on the ocean floor. The curve down off the barge and then reverse curve onto the ocean floor gives a "S" bend in the pipeline during the lay process. The stinger allows the pipeline and its associated weight to be curved down toward the ocean floor without kinking or damaging the pipeline.

The stinger will involve several rollers to form a bending radius down to the angle necessary to go to the ocean floor. They are typically of a "V" shape, to allow them to be workable with a variety of pipeline sizes. It is inherent that it would be difficult for a skid package to go over the rollers in a "S" lay stinger. In addition to interferences with the rollers, there will be interferences with side structures in the pipe lay operations, and the long rigid section implied by the length of the manifold would substantially complicate the associated bending stresses while bending the pipe around the stinger.

In deeper water, it is advantageous to connect the pipeline vertically and lower it directly into the water, with a single bend at the ocean floor. This gives the shape of a "J" for a system known as J-Laying pipe. The "J" will not normally be vertical at the top, but rather must have an angle with a horizontal component to be able to pull horizontal tension on the pipeline as it is being laid onto the ocean floor. If it does not have horizontal tension during laying;, it will buckle as it is laid on the ocean floor and be damaged beyond use.

J-Lay towers characteristically have a relatively small hole through the main work area which is designed to engage and support the weight of the pipeline being run. Additionally they will have a stinger below the working area which is similar to the one on the "S" lay barge, except instead of bending in one direction, it will have full circle bending capability. When the J-Lay tower is properly aligned with the pipeline being laid below it, it will be lined up with the pipeline and not require the handling of a bending moment when installing a subsea manifold. However, J-Lay towers tend to be more restrictive in size openings to pass manifold skids than the "S" lay barges are.

The present invention is directed to overcoming, or at least reducing the effects of one or more of the problems set forth above.

SUMMARY OF THE INVENTION

The object of this invention is to provide a method whereby subsea manifolds can be installed on a section of a subsea pipeline after the subsea pipeline has passed the restrictive areas characteristic to the laying of the pipe.

A second object of this invention is to provide means for attaching subsea manifolds to pipelines after the portion of the pipeline to which the pipeline will be attached is already below sea level.

A third object of this invention is to provide means for preventing the pipeline connection point for attaching subsea manifolds from flooding before the manifold is attached.

Another object of this invention is to provide means to move sections of a pipeline including valves and tees past rollers on stingers without damaging the rollers.

Another object of this invention is to provide means to allow the removal of a subsea manifold from a subsea pipeline for replacement or repairs after it is in service.

Other objects and advantages of the invention will become apparent upon reading the following detailed description and upon referring to the drawings which follow.

Figure 1:
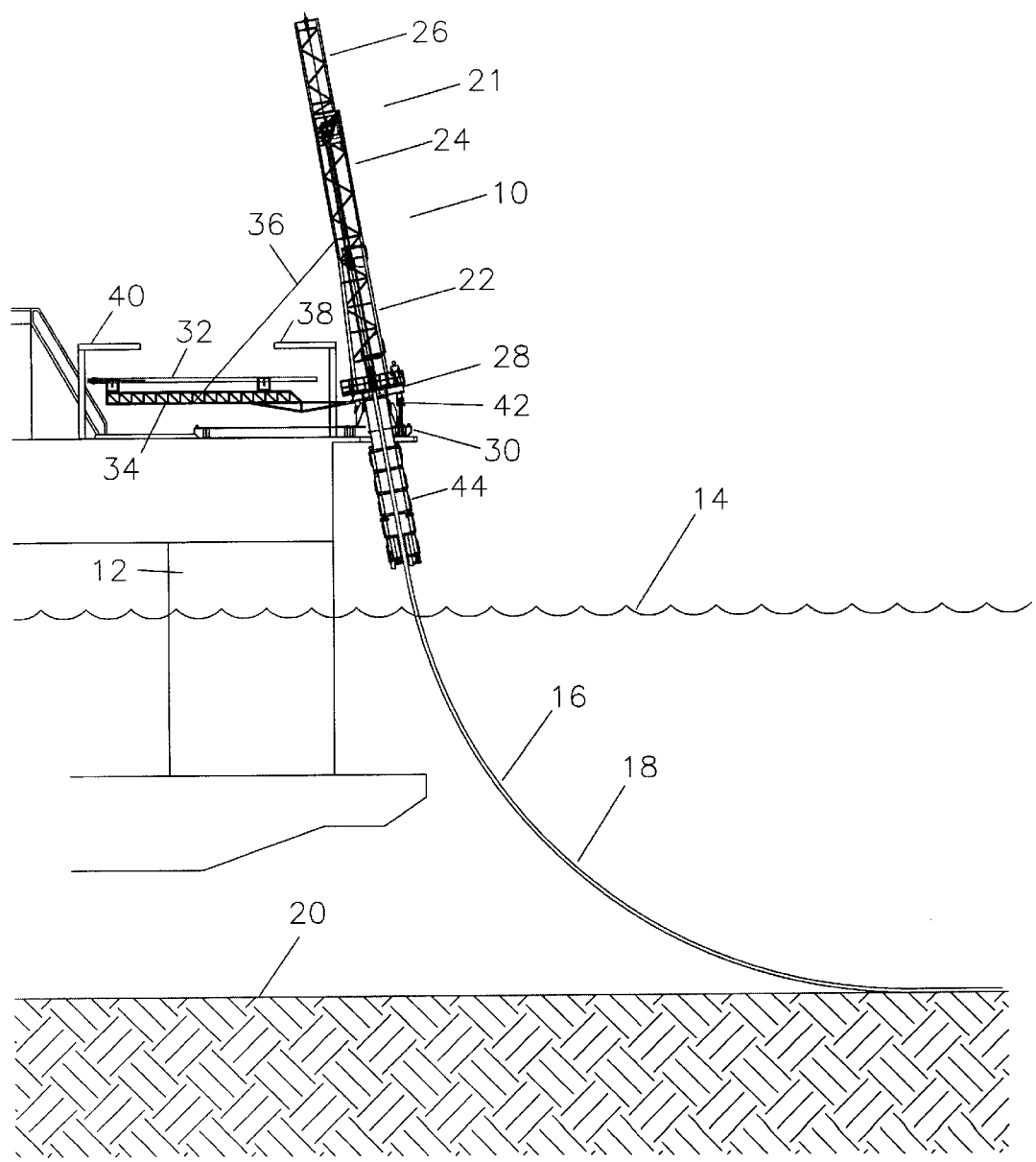
FIG. 1 illustrates the apparatus for assembling and deploying pipe string underwater by the J-Lay method, mounted on the rear of a floating vessel and deploying a pipeline.
Figure 2:
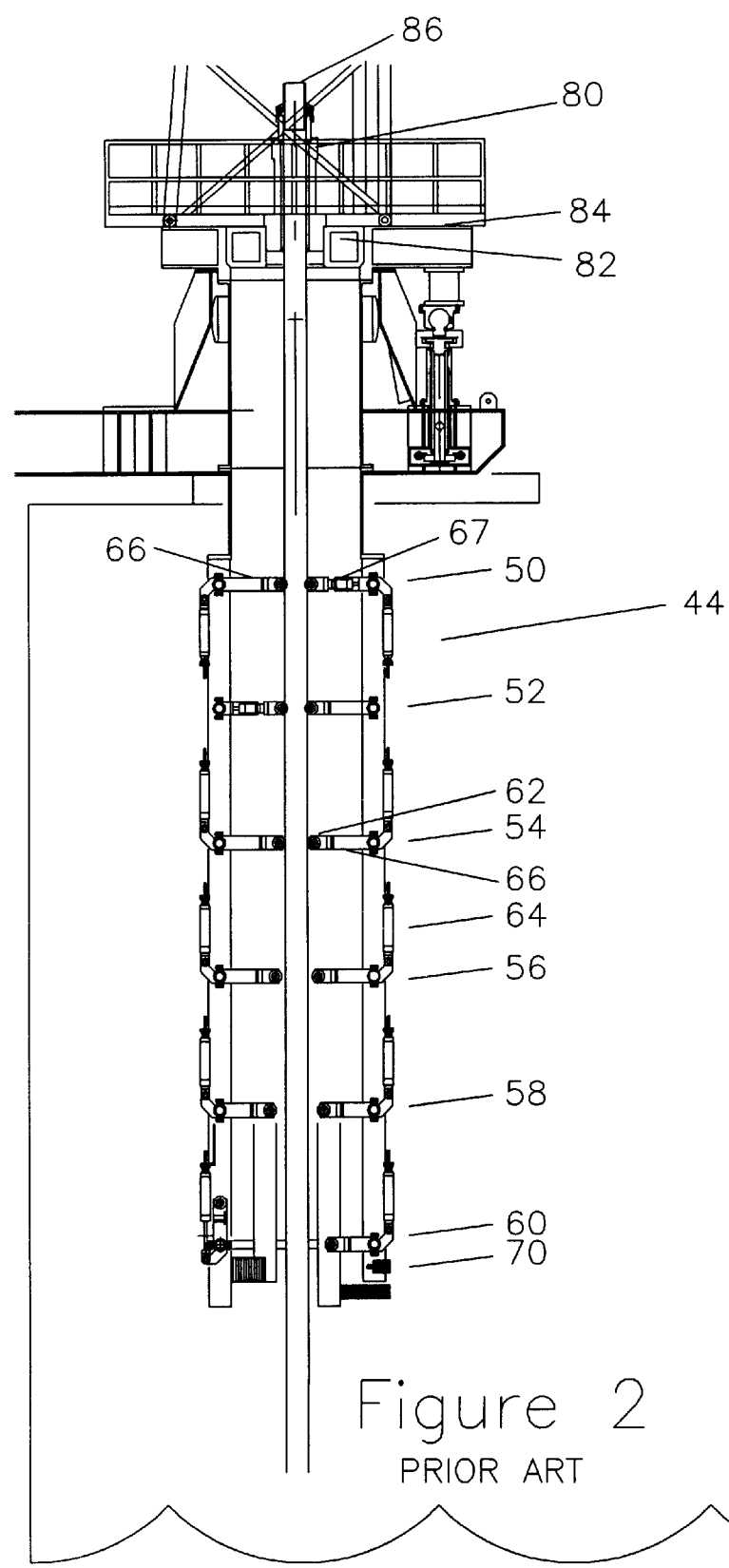
FIG. 2 shows a half section of the work table area of a J-Lay system and the stinger below the work table.

While the invention is susceptible to various modifications and alternative forms, specific embodiments thereof have been shown by way of example in the drawings and are herein described in detail. It should be understood, however, that the description herein of specific embodiments Is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Referring now to FIG. 1, the j-lay tower 10 is shown on a floating vessel 12 in a body of water 14 with a pipeline 16 extending below the j-lay tower 10 around a bend 18 and onto the ocean floor 20. The j-lay tower 10 is shown with a mast 21 including a lower section 22, a middle section 24, and an upper section 26; a working table 28; and a skid 30. A new pipeline section 32 is shown on the erector 34 with cable 36 attached for pulling the erector up to the mast sections. Jib cranes 38 and 40 are provided for handling of the new pipe section 32 up to the erector 34. As can be noted, the tower is inclined at an angle convenient to the laying of the pipeline. Jack assemblies 42 assist in the changing of the tower angle as required. Stinger 44 provides internal rollers whose inner diameter provide a curvature to prevent over-bending of the pipeline. The preferred running style Is with the tower perfectly aligned to the pipeline, while using the angle gained around the curvature of the stinger as a margin of error if unforeseen events occur.

Referring now to figure no. 2, stinger 44 is shown comprised of six stations 50, 52, 54, 56, 58, and 60 which include multiple rollers 62 to restrict the bending radius of the pipeline. All stations are equipped with cylinders 64 to swing the arms 66 and rollers 62 of the stations out of the bore to allow large object to pass through the stinger and into the bore to provide the preferred bending radius. Stations 50 and 52 have four arms 66 at 90° apart. Two adjacent arms 66 fold down to a fixed position at a distance from the centerline of the stinger approximately equal to the radius of the pipeline 16. The other two arms 66 include cylinders 67 which press the rollers 62 tightly against the pipeline 16 after being folded into the bore of the stinger 44. In this manner, the pipeline 16 is immobilized against movement during the welding process.

Each of the additional stations 54–60 have arms 66 which fold down to a fixed position of a progressively larger radius from top to bottom. At the bottom of the stinger 44, a camera 70 or similar viewing device is installed to monitor the position of the pipeline 16 within the stinger 44.

After a new section of pipe is welded to the pipeline, the pipeline is lowered and landed on split bushings 80 and 82 on work table 84. The next section of pipeline to be added to the pipeline 16 will be positioned so as to be welded at 86.

When split bushings 80 and 82 are removed and each of the sets of 50–60 are folded out of the way, a open passageway will exist thru the stinger 44. On recently constructed J-Lay towers, this hole has been 62" in diameter. This would imply that if a manifold were welded onto the pipeline at 86, it would need to be smaller in diameter than 62", rather than the 10 foot×12 foot structures discussed earlier.

Figure 3:
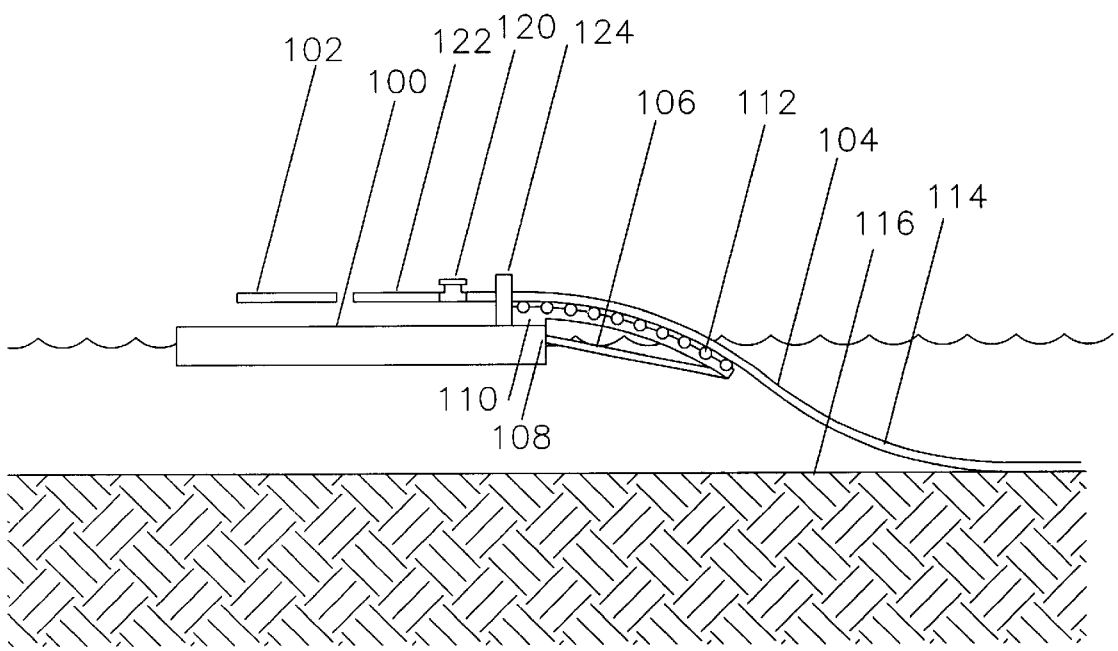
FIG. 3 shows a schematic of an S-Lay barge laying a pipeline to the ocean floor, and adding a special tee to the pipeline on the deck of the barge.

Referring now to FIG. 3, an S-Lay barge shown with a new pipe section 102 positioned for welding to the pipeline 104. Stinger 106 is attached to the barge 100 at 108 and 110 and provides a plurality of rollers 112 which restrict the bending radius of the pipeline 104 as it is lowered off the back of the barge 100. The radius 114 at the seafloor 116 is limited by the barge pulling forward and exerting tension on the pipeline 104.

Tee 120 is shown welded into the pipeline at a conventional working area 122. After tee 120 is welded into the pipeline, it must pass obstructions 124 on the deck of the vessel and any restrictions on the rollers 112 on the stinger 106. Obstructions 124 are shown as above a flat deck. In reality, on an efficiently designed barge, the stinger may be mounted so low that the pipe is already curved down before it passes the end of the barge and is therefore in a notch cut into the barge. Such restrictions would be immoveable for all practical considerations.

A radius of construction of the stinger is to minimize the bending radius of the pipeline, a rigid straight section in the pipeline would tend to exacerbate the bending radius in the pipeline on each end of the straight section. The longer the straight section, the more impact on the adjacent sections. As stingers of this nature are characteristically designed only to handle uniform pipe, it is useful to keep the addition of manifolds as close to uniform pipe as practical.

Figure 4:
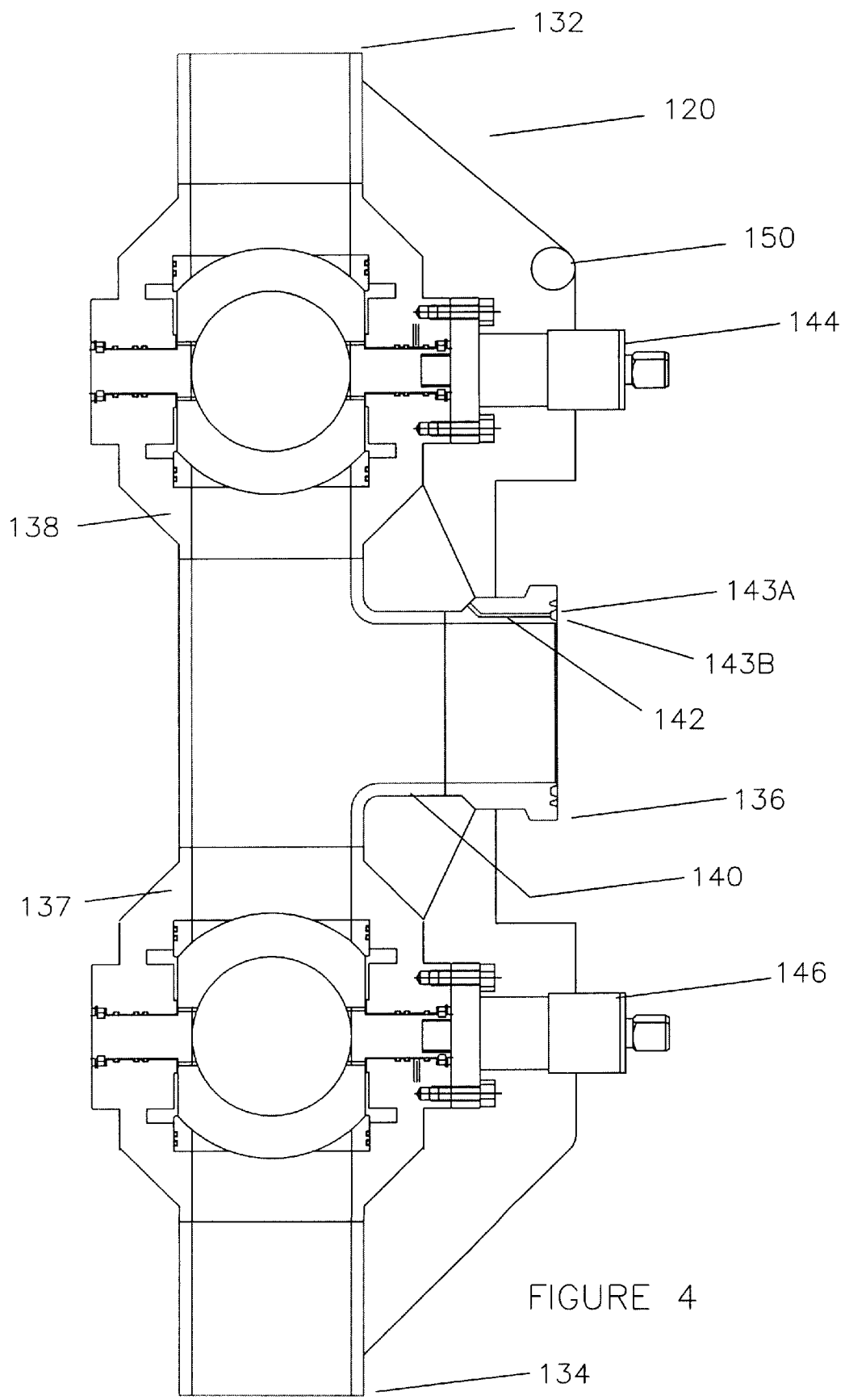
FIG. 4 shows a half section of a tee which can be added into a pipeline to allow the connection to pass through the restricted work areas of a J-Lay or S-Lay vessel.
Figure 6:
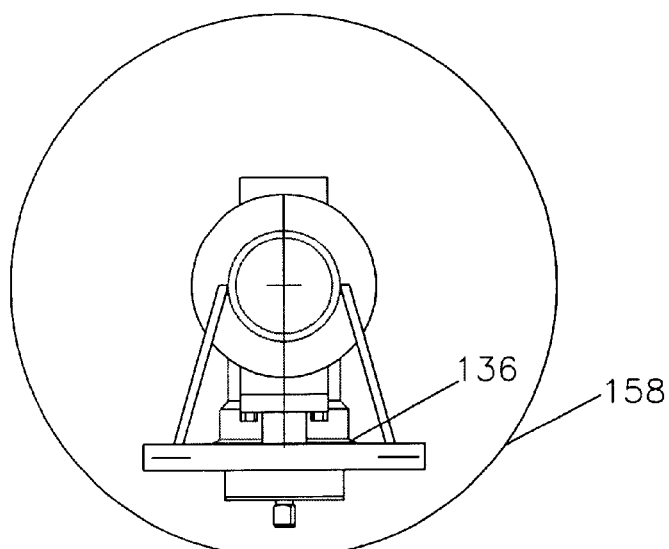
FIG. 6 shows a top view of FIG. 5.
Figure 5:
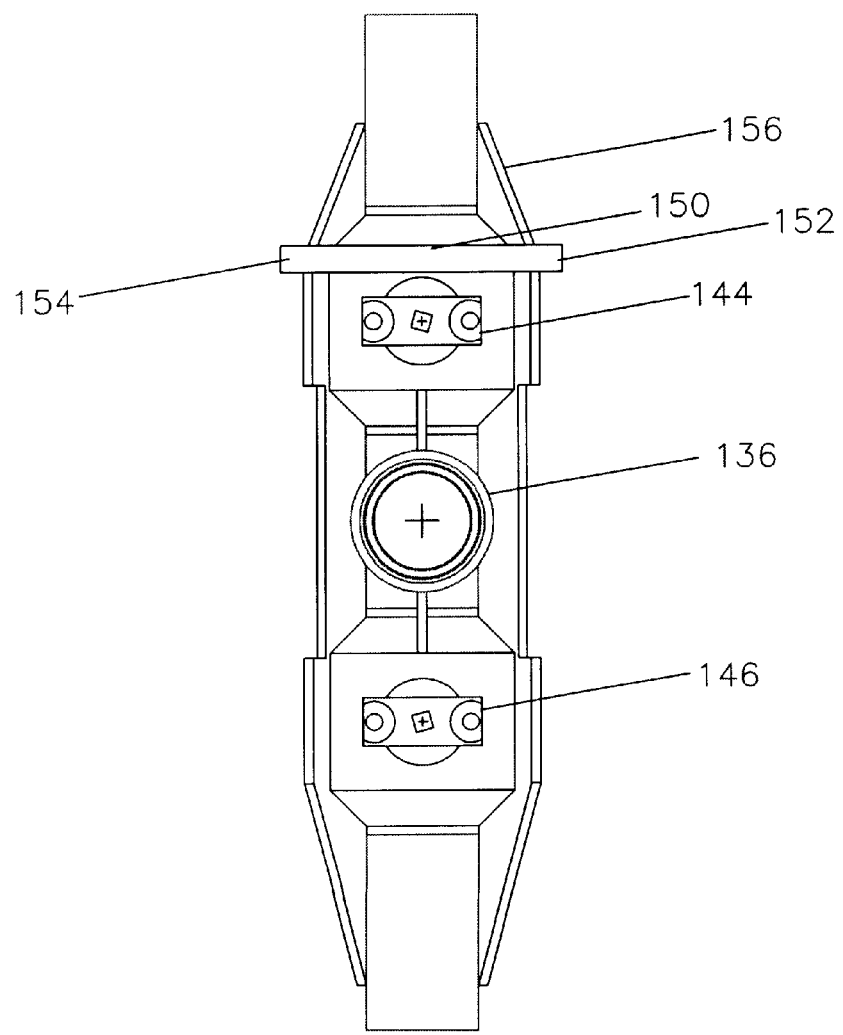
FIG. 5 shows a front view of FIG. 4.

Referring now to FIGS. 4, 5, and 6, views of a tee 120 are shown. The tee 120 has welding ends 132 and 134 for welding into the pipeline and clamp hub 136 for the connection of a subsea manifold. Valves 137 and 138 are provided initially in the closed position such that when the tee 120 is lowered into the seawater, the pipeline will not be flooded. After being landed on the seafloor, they can be opened and operated in the future for pipeline control operations. If desired a single valve can be added in the outlet run 140 to prevent the pipeline from being flooded, and allow isolation of the outlet while allowing free flow through the pipeline. This makes the main pipeline less stiff for bending which is advantageous for the S-Lay operations. It makes the radial extension of the clamp hub 136 greater which is a potential problem for the J-Lay operations. Alternately, valve 138 can be left off the assembly to reduce both cost and stiffness. It will allow the long pipeline below the tee to be kept dry, and only allow flooding of the shorter section above until the subsea manifold is attached.

Line 142 illustrates a means for pressure testing between multiple seals to insure the reliability of the connection before proceeding to land an attached subsea manifold on the ocean floor. Line 142 exits the clamp hub 136 between outer seal area 143A and inner seal area 143B. Metal or resilient seals as are well known in the art can be carried on the mating profile to engage the clamp hub 136 and seal on each of these surfaces. If line 142 is pressured the seal area 143A will be tested outwardly and the seal area 143B will be tested inwardly. A line such as 142 can also be used to inject a repair sealant into the connection.

Profiles 144 and 146 illustrate a profile for attachment of an actuator to operate the valves. The particular profile shown is of an API 17D style for remotely operated vehicle intervention, allowing the valves to be remotely operated by a submarine type vehicle.

Bar 150 with ends 152 and 154 is mounted on structures 156. The ends 152 and 154 will provide guidance for the alignment and landing of the subsea manifold, as will be seen later.

FIG. 6 illustrates the relative size of a 62" I.D. 158 of a stinger in comparison to a 12" nominal pipeline system. This illustrates that a tee such as this could be lowered through such clearances on centerline with the stinger. Some additional advantage can be gained by moving the tee off center when running.

Figure 7:
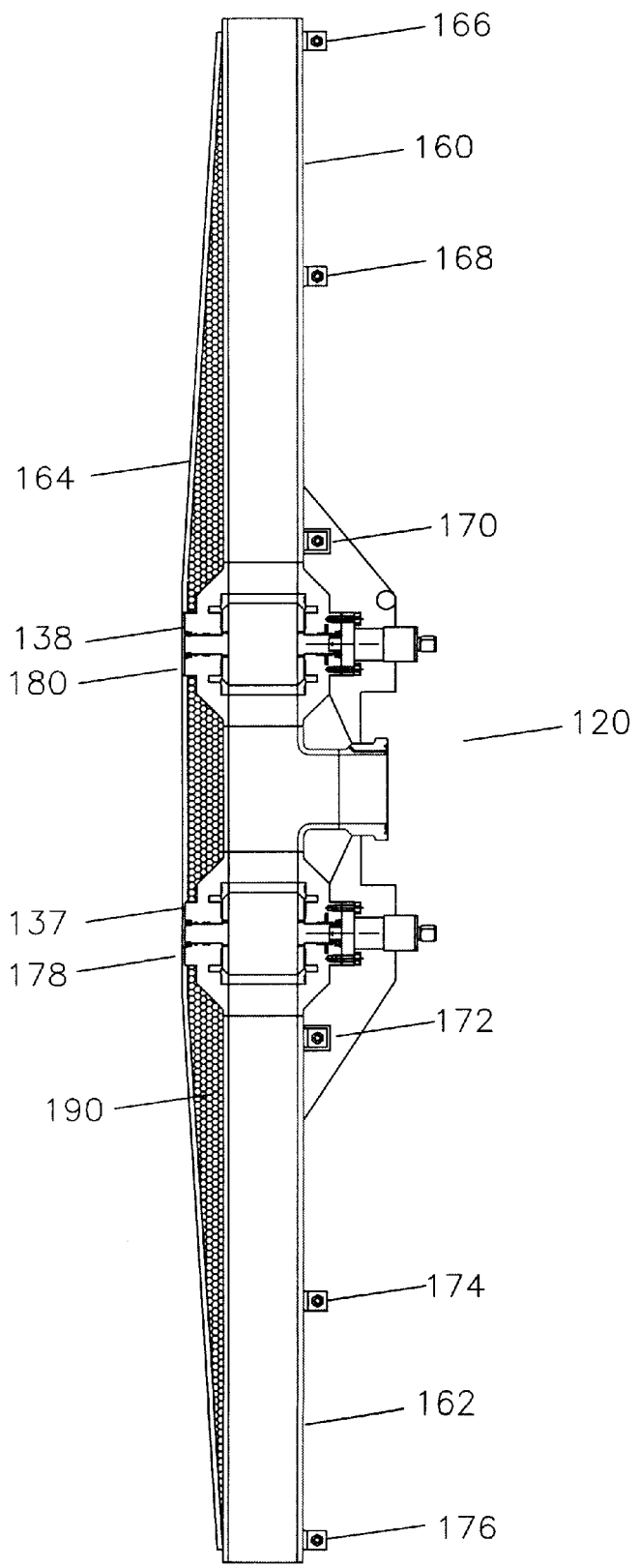
FIG. 7 shows a tee with a semi-circular section added to the bottom to facilitate its passing over the rollers on a stinger.

FIG. 7 shows the tee 120 with pipe sections 160 and 162 added. Semi-circular pipe section 164 is shown clamped to the pipe sections 160 and 162 by bolted clamps 166–176. Semi-circular pipe section 164 is curved from being adjacent the pipe sections 160 and 162 at each end, and protruding as far at the bottom of valves 137 and 138 at the center. Clearances are provided for valves 137 and 138 are provided at 178 and 180 as required. Filler material 190 such as syntactic foam is provided in the space between the pipeline sections 160 and 162 and the semi-circular pipe section 164.

The added material to the tee 120 forms a ramp which allows it to bend over the rollers 112 on stinger 106 of FIG. 3 with only slightly increased bending stresses, and allows the necessary valve projections to pass each roller. In cases on the J-Lay stinger where the mast 21 is not perfectly aligned with the pipeline, the same benefits will be provided to the J-Lay type stinger. FIG. 1 shows a mast 21 which is tilted or gimbaled to near alignment with the pipeline. Existing drilling rigs are expected to be used for J-Laying pipelines with vertical masts. In the case of vertical mast drilling rigs, the benefits of this feature to J-Lay operations is increased.

A benefit of the semi-circular pipe section 164 being loosely bolted to the pipeline sections is that the moment of inertia or relative rigidity of the pipe section remains near the same as the remainder of the pipeline.

Figure 8:
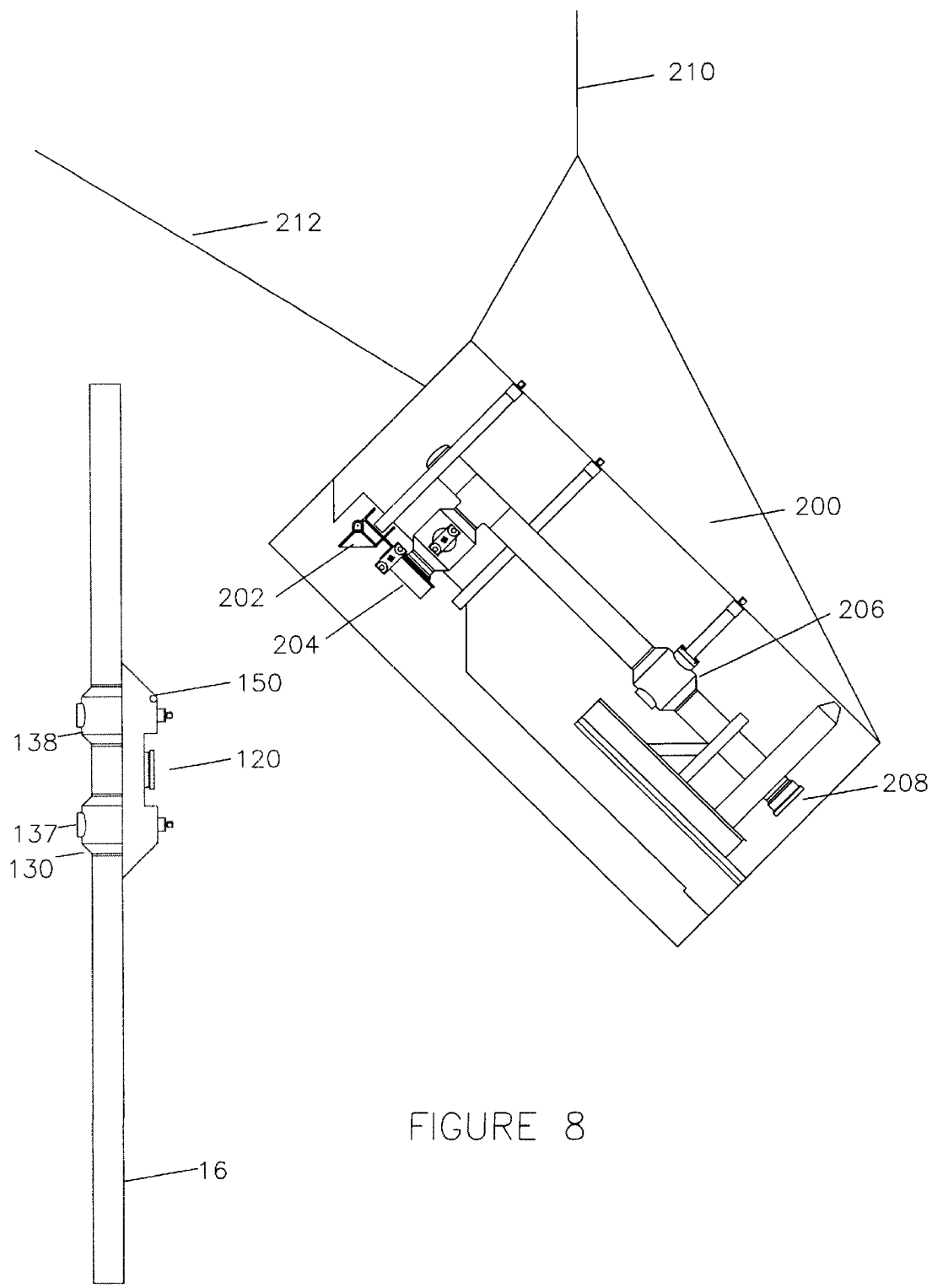
FIG. 8 is a schematic of a tee of this invention having been lowered into the water below the restrictive work areas on a J-Lay or S-Lay vessel, and a subsea manifold being lowered to engage with the tee.

FIG. 8 illustrates a tee 120 in a pipeline 16 such as might be lowered below either an S-lay barge or a J-Lay barge past the restricted areas. It provides valves 137 and 138 along with clamp hub 136 and bar 150. Subsea manifold 200 includes landing guides 202 for engaging the bar 150, a clamp make-up means 204, valves and components 206, and a connector 208 which might connect to other pipelines. Lifting line 210 holds the weight of the subsea manifold 200 and guiding line 212 pulls subsea manifold 200 toward the pipeline 16.

Figure 9:
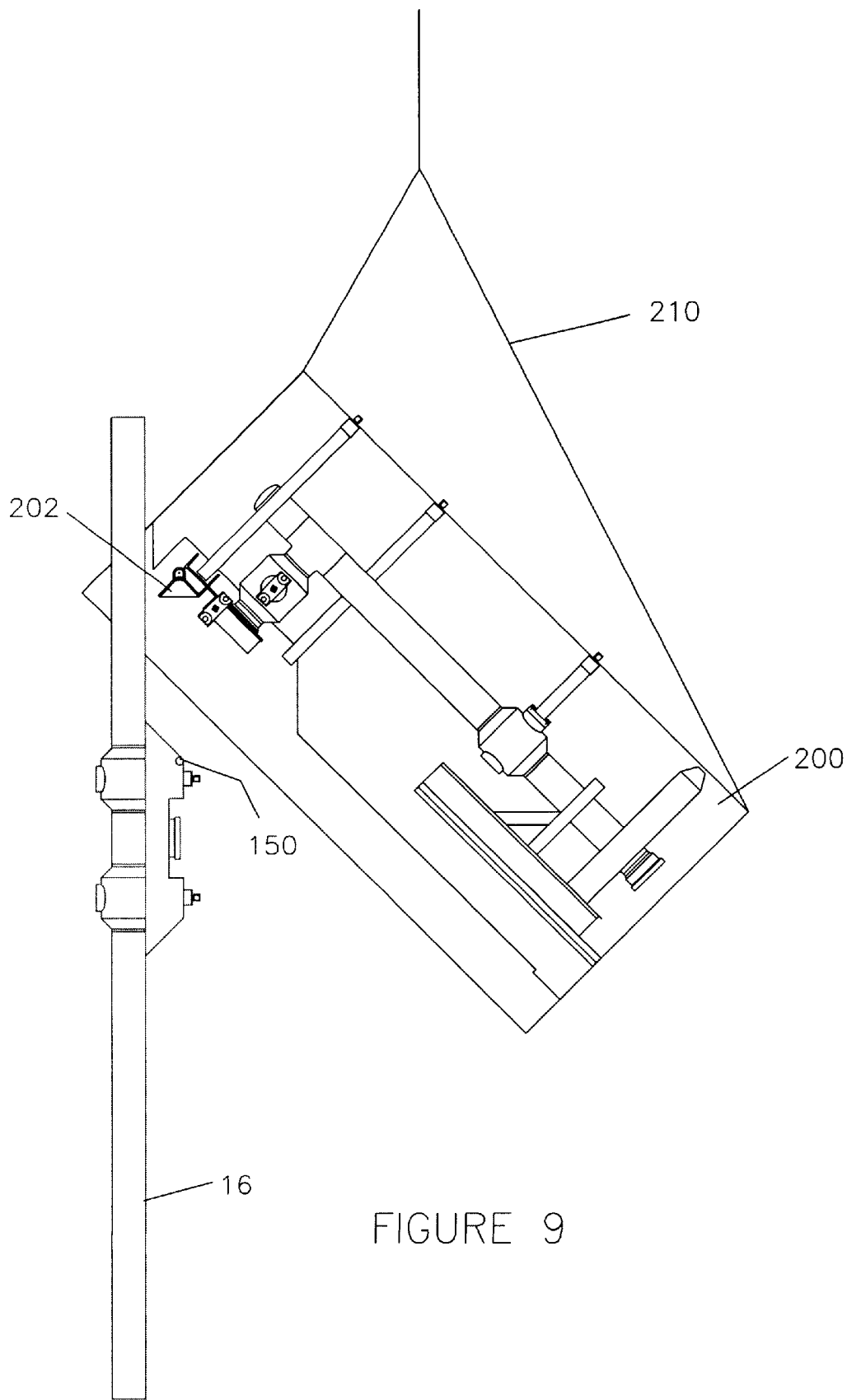
FIG. 9 shows the subsea manifold of FIG. 8 brought adjacent to the pipeline.

FIG. 9 shows that the subsea manifold 200 has been moved horizontally to a position adjacent to the pipeline 16, but with the guides 202 above the bar 150.

Figure 10:
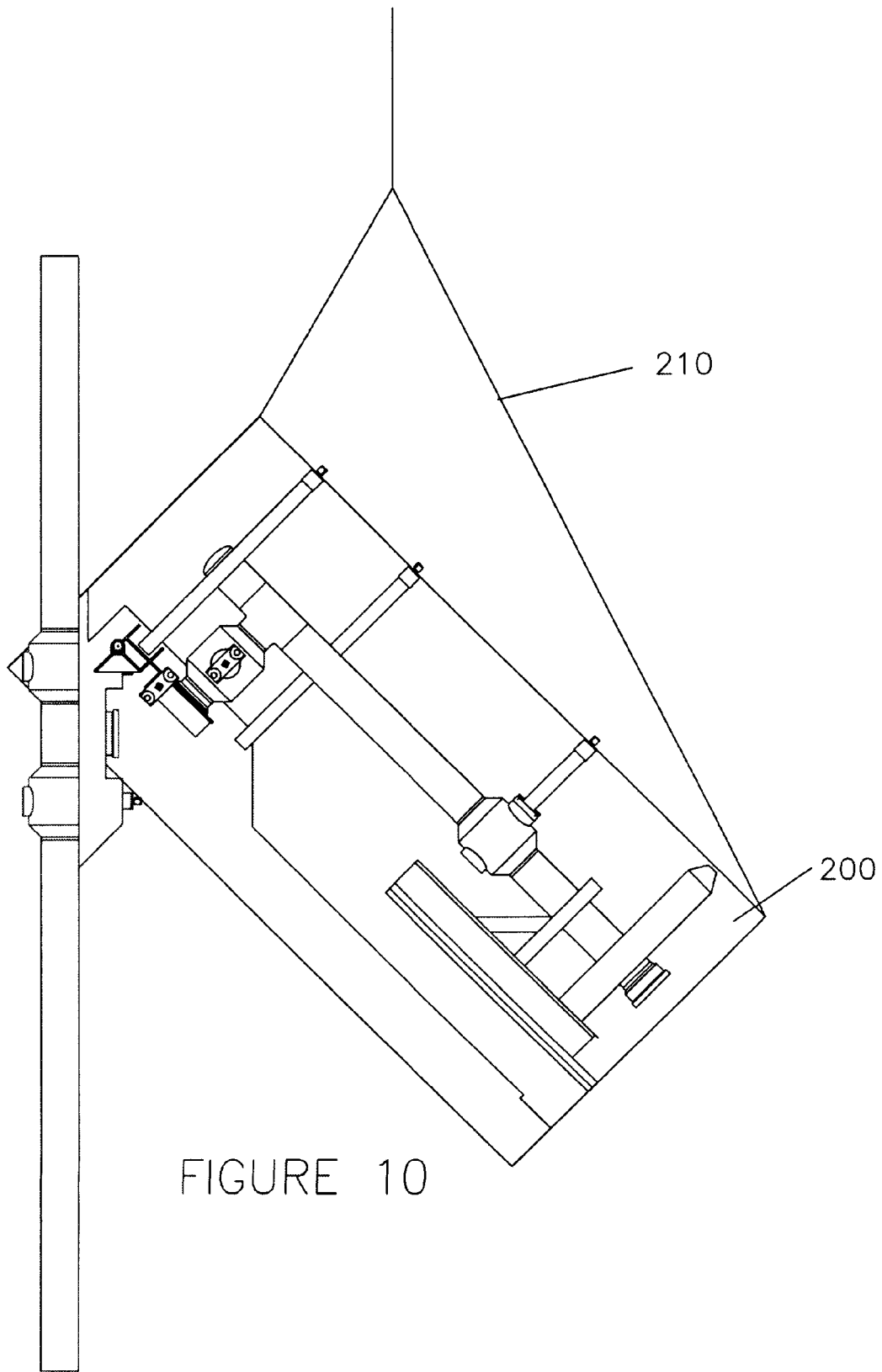
FIG. 10 shows the subsea manifold of FIG. 9 lowered onto a pivot bar.

FIG. 10 shows that the subsea manifold 200 has been lowered until the guides 202 have engaged the bar 150.

Figure 11:
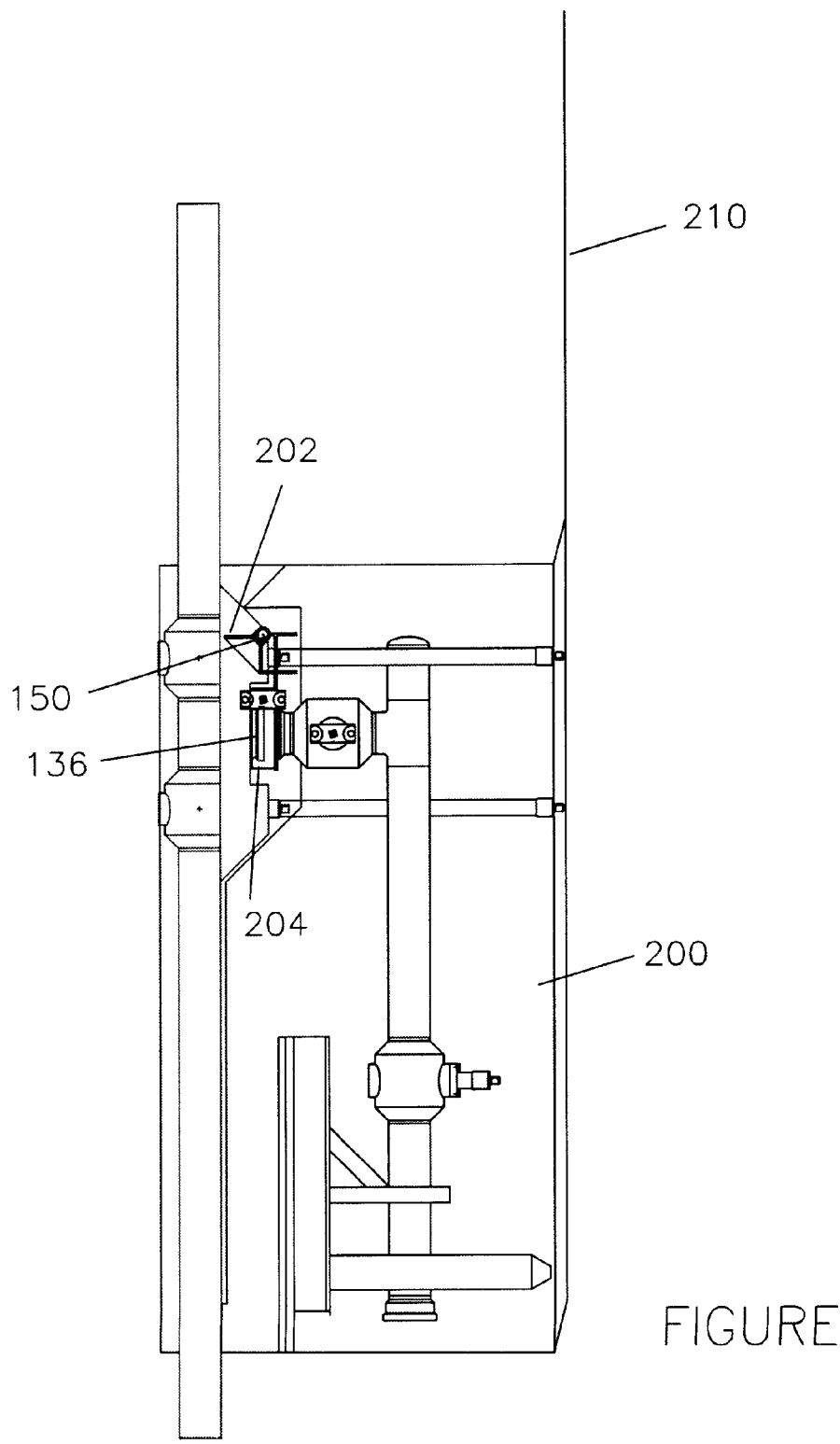
FIG. 11 shows the subsea manifold of FIG. 10 pivoted down into engagement with the clamp hub on the pipeline for sealing engagement.

FIG. 11 shows that the lifting line 210 has been slacked off until the subsea manifold 200 pivots down and allows the clamp make-up means 204 to engage the clamp hub 136. Various connector means can be substituted for the clamp style at the user's preference. As soon as this position is achieved a remotely operated vehicle can engage and actuate the connector, or hydraulic wrenches position in place can be operated by remote control. By this method, subsea manifolds too large to be reasonably handled through a S-Lay or J-Lay system can be attached and lowered with a subsea pipeline to the ocean floor.

When the subsea manifold is landed on the ocean floor, the connector means 204 can be released and the subsea manifold can be retrieved to the surface independently of the pipeline. If desired, it can be reinstalled, or a different subsea manifold can be installed at a later date.

The particular embodiments disclosed above are illustrative only, as the invention may be modified and practiced in different but equivalent manners apparent to those skilled in the art having the benefit of the teachings herein. Furthermore, no limitations 6 are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method for attaching a subsea manifold to a subsea pipeline comprising attaching a tee in said pipeline, running said tee from the attachment area of a vessel through areas which are not large enough to pass said subsea manifold, attaching said subsea manifold to said tee, and running said tee and said manifold to the sea floor.

2. The method of claim 1, wherein a valve is added to the upstream and downstream side of said tee.

3. The method of claim 1, wherein a valve is added to the outlet run of said tee to prevent the flooding of said pipeline prior to the installation of said subsea manifold.

4. The method of claim 1 further comprising holding said subsea manifold at an angle with respect to its final position regarding said pipeline, engaging said subsea manifold with pivot means on said pipeline, lowering said subsea manifold to cause a pivoting to the angle of said pipeline, and connecting said subsea manifold to said tee.

5. The method of claim 4, wherein a connector on said subsea manifold locks onto a mating profile on said tee.

6. The method of claim 5, wherein two independent seals are provided between said mating profile on said tee and said connector on said subsea manifold and a port is provided to test between said two independent seals.

7. A method for attaching a subsea manifold to a subsea pipeline comprising attaching a tee in said pipeline, running said tee from the attachment area of a vessel through areas which are not large enough to pass said subsea manifold, attaching said subsea manifold to said tee, and running said tee and said manifold to the sea floor.

wherein a valve is added to the upstream and downstream side of said tee, wherein a ramp is added on each side of said valves to facilitate the passage of the area of the valves over the rollers on a stinger.

8. The method of claim 3, wherein said ramp is mounted to said pipeline with a axially loose connection to minimize the increase in bending stiffness of the pipeline.

9. A method for attaching a subsea manifold to a subsea pipeline comprising attaching a tee in said pipeline, running said tee from the attachment area of a vessel through areas which are not large enough to pass said subsea manifold, attaching said subsea manifold to said tee, and running said tee and said manifold to the sea floor, holding said subsea manifold at an angle with respect to its final position regarding said pipeline, engaging said subsea manifold with pivot means on said pipeline, lowering said subsea manifold to cause a pivoting to the angle of said pipeline, and connecting said subsea manifold to said tee, wherein a connector on said subsea manifold locks onto a mating profile on said tee, wherein two independent seals are provided between said mating profile on said tee and said connector on said subsea manifold and a port is provided to test between said two independent seals, wherein repair sealant can be injected between said two independent seals in case of leakages.

10. A method for attaching a subsea manifold to a subsea pipeline which during the laying process on a vessel must pass space restrictions which can not pass said subsea manifold comprising attaching a tee in said pipeline on said vessel, running said tee from the attachment area of said vessel through areas which are not large enough to pass said subsea manifold, attaching said subsea manifold to said tee, and running said tee and said manifold to the sea floor.

11. The method of claim 10, wherein one or more valves are added to said tee.

12. The method of claim 10 further comprising engaging said subsea manifold with said tee on said subsea pipeline after said tee is underwater.

13. The method of claim 10, wherein a connector on said subsea manifold locks onto a mating profile on said tee.

14. The method of claim 13, wherein two independent seals are provided between said mating profile on said tee and said connector on said subsea manifold and a port is provided to test between said two independent seals.

15. The method of claim 14, wherein repair sealant can be injected between said two independent seals in case of leakages.

16. A method for attaching a subsea manifold to a subsea pipeline which during the laying process on a vessel must pass space restrictions which can not pass said subsea manifold comprising attaching a tee in said pipeline on said vessel, running said tee from the attachment area of said vessel through areas which are not large enough to pass said subsea manifold, attaching said subsea manifold to said tee, and running said tee and said manifold to the sea floor, further comprising releasing said subsea manifold from said pipeline after said subsea pipeline is landed on said sea floor.

17. A method for including a subsea manifold in a subsea pipeline, comprising attaching a tee in said pipeline on a vessel, running said tee from the attachment area of said vessel to a subsea location intermediate said vessel and the sea floor, lowering said subsea manifold to said intermediate subsea location and attaching said subsea manifold to said tee, and running said portion of said pipeline with said tee and said manifold to said sea floor.

18. The method of claim 17, further comprising including one or more valves in said pipeline to prevent the flooding of seawater into the pipeline prior to the attachment of said subsea manifold.

19. A method for including a subsea manifold in a subsea pipeline, comprising attaching a tee in said pipeline on a vessel, running said tee from the attachment area of said vessel to a subsea location intermediate said vessel and the sea floor, lowering said subsea manifold to said intermediate subsea location and attaching said subsea manifold to said tee, running said portion of said pipeline with said tee and said manifold to said sea floor, including one or more valves in said pipeline to prevent the flooding of seawater into the pipeline prior to the attachment of said subsea manifold, and adding ramps to said tee and said one or more valves to facilitate their passage over rollers in a stinger.

20. A method for including a subsea manifold in a subsea pipeline, comprising attaching a tee in said pipeline on a vessel, running said tee from the attachment area of said vessel to a subsea location intermediate said vessel and the sea floor, lowering said subsea manifold to said intermediate subsea location and attaching said subsea manifold to said tee, running said portion of said pipeline with said tee and said manifold to said sea floor, wherein a remotely controlled connector for connecting said subsea manifold to said tee, and said remotely controlled connector having dual seals and means to test between said dual seals.

* * * * *